(12) United States Patent
Porter et al.

(10) Patent No.: US 9,175,565 B2
(45) Date of Patent: Nov. 3, 2015

(54) SYSTEMS AND APPARATUS RELATING TO SEALS FOR TURBINE ENGINES

(75) Inventors: Christopher Donald Porter, Mauldin, SC (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 13/566,189

(22) Filed: Aug. 3, 2012

(65) Prior Publication Data
US 2014/0037435 A1 Feb. 6, 2014

(51) Int. Cl.
F01D 5/08 (2006.01)
F01D 11/00 (2006.01)
F01D 11/04 (2006.01)

(52) U.S. Cl.
CPC ............. *F01D 5/081* (2013.01); *F01D 11/001* (2013.01); *F01D 11/04* (2013.01); *F05D 2240/55* (2013.01); *F05D 2240/81* (2013.01); *Y02T 50/673* (2013.01); *Y02T 50/676* (2013.01)

(58) Field of Classification Search
CPC .... F01D 11/001; F01D 11/04; F05D 2240/55
See application file for complete search history.

(56) References Cited

U.S. PATENT DOCUMENTS

| 4,856,419 A | 8/1989 | Imai |
| 5,197,852 A | 3/1993 | Walker et al. |
| 5,247,746 A | 9/1993 | Johnson et al. |
| 5,344,283 A | 9/1994 | Magowan et al. |
| 5,413,458 A | 5/1995 | Calderbank |
| 5,609,466 A | 3/1997 | North et al. |
| 5,997,245 A | 12/1999 | Tomita et al. |
| 6,089,822 A | 7/2000 | Fukuno |
| 6,092,983 A | 7/2000 | Tomita et al. |
| 6,173,710 B1 | 1/2001 | Gibson et al. |
| 6,254,333 B1 | 7/2001 | Merry |
| 6,471,213 B1 | 10/2002 | Yuri et al. |
| 6,481,959 B1 * | 11/2002 | Morris et al. ................. 415/115 |

(Continued)

FOREIGN PATENT DOCUMENTS

| EP | 1998006 A2 | 12/2008 |
| JP | H10184312 A | 7/1998 |
| JP | H11336506 A | 12/1999 |

OTHER PUBLICATIONS

PCT Search Report and Written Opinion issued Apr. 28, 2014 in connection with corresponding PCT Patent Application No. PCT/US2013/053142.

*Primary Examiner* — Edward Look
*Assistant Examiner* — Cameron Corday
(74) *Attorney, Agent, or Firm* — Mark E. Henderson; Ernest G. Cusick; Frank A. Landgraff

(57) ABSTRACT

A seal in a turbine of a combustion turbine engine is described. The seal is formed within a trench cavity defined between a rotor blade and a stator blade. The stator blade includes a sidewall projection and the rotor blade includes an angel wing projection extending toward the stator blade. The sidewall projection overhangs the angel wing projection. The seal include: a port disposed on an inboard surface of the stator projection; and deflecting structure disposed on the angel wing projection. The deflecting structure may be configured to receive the fluid expelled from the port and deflect the fluid toward an inlet of the trench cavity.

18 Claims, 7 Drawing Sheets

(56) References Cited

U.S. PATENT DOCUMENTS

| | | |
|---|---|---|
| 6,761,529 B2 | 7/2004 | Soechting et al. |
| 7,140,233 B2 | 11/2006 | Vogel |
| 7,238,001 B2 * | 7/2007 | Rushton ........................ 415/110 |
| 8,011,881 B1 | 9/2011 | Liang |
| 8,038,399 B1 * | 10/2011 | Liang .............................. 416/95 |
| 2010/0008760 A1 | 1/2010 | Morris et al. |
| 2010/0074734 A1 | 3/2010 | Little |
| 2010/0183426 A1 * | 7/2010 | Liang ........................... 415/110 |

* cited by examiner

SYSTEMS AND APPARATUS RELATING TO SEALS FOR TURBINE ENGINES

BACKGROUND OF THE INVENTION

The present application relates generally to systems and/or apparatus for improving the efficiency and/or operation of turbine engines, which, as used herein and unless specifically stated otherwise, is meant to include all types of turbine or rotary engines, including gas turbine engines, aircraft engines, steam turbine engines, and others. More specifically, but not by way of limitation, the present application relates to systems and apparatus pertaining to improved seals for turbine engines.

In general, a gas turbine engine (which, as discussed below, may be used to illustrate an exemplary application of the current invention) includes a compressor, a combustor, and a turbine. The compressor and turbine generally include rows of blades that are axially or circumferentially stacked in stages. Each stage includes a row of circumferentially-spaced stator blades, which are fixed, and a row of rotor blades, which rotate about a central axis or shaft. In operation, generally, the compressor rotor blades rotate about the shaft, and, acting in concert with the stator blades, compress a flow of air. The supply of compressed air then is used in the combustor to combust a supply of fuel. Then, the resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated.

During operation, because of the extreme temperatures of the hot-gas path, great care is taken to prevent components from reaching temperatures that would damage or degrade their operation or performance. As one of ordinary skill in the art will appreciate, one area that is sensitive to extreme temperatures is the space that is radially inward of the hot-gas path. This area, which is often referred to as the inner wheelspace or wheelspaces of the turbine, contains the several turbine wheels or rotors onto which the rotating rotor blades are attached. While the rotor blades are designed to withstand the extreme temperatures of the hot-gas path, the rotors are not and, thus, it is necessary that the working fluid of the hot-gas path be prevented from flowing into the wheelspace. However, axial gaps necessarily exist between the rotating blades and the surrounding stationary parts and it is through these gaps that working fluid gains access to the wheelspace. In addition, because of the way the engine warms up and differing thermal expansion coefficients, these gaps may widen and shrink depending on the way the engine is being operated. This variability in size makes it difficult to adequately seal these gaps.

Generally, this means that the turbine wheelspace must be purged to avoid hot gas ingestion. Purging requires that the pressure within the wheelspace be maintained at a level that is greater than the pressure of the working fluid. Typically, this is achieved by bleeding air from the compressor and routing it directly into the wheelspace. When this is done an out-flow of purge air is created (i.e., a flow of purge air from the wheelspace to the hot-gas path), and this out-flow through the gaps prevents the in-flow of working fluid. Thereby, the components within the wheelspace are protected from the extreme temperatures of the working fluid.

However, purging systems increase the manufacturing and maintenance cost of the engine, and are often inaccurate in terms of maintaining a desired level of pressure in the wheelspace cavity. In addition, purging the wheelspace comes at a price. As one of ordinary skill in the art will appreciate, purge flows adversely affect the performance and efficiency of the turbine engine. That is, increased levels of purge air reduce the output and efficiency of the engine. Hence, the usage of purge air should be minimized. As a result, there is a need for improved methods, systems and/or apparatus that better seal the gaps/wheelspace cavity from the working fluid, thereby reducing wheelspace ingestion and/or the usage of purge air.

BRIEF DESCRIPTION OF THE INVENTION

The present application thus describes a seal in a turbine of a combustion turbine engine. In one embodiment, the seal is formed within a trench cavity defined between a rotor blade and a stator blade. The stator blade may include a sidewall projection extending toward the rotor blade and the rotor blade may include an angel wing projection extending toward the stator blade. The side wall projection may overhang the angel wing projection. The seal may further include: a port disposed on an inboard surface of the stator projection; and deflecting structure disposed on an outboard surface of the angel wing projection. The port may be configured to direct a fluid expelled therefrom toward the deflecting structure. The deflecting structure may be configured to receive the fluid expelled from the port and deflect the fluid toward an inlet of the trench cavity.

The application further describes a combustion turbine engine that includes a seal formed within a trench cavity defined between a rotor blade and a stator blade. The seal may include: a port disposed on an inboard surface of the stator projection; and deflecting structure disposed on an outboard surface of the angel wing projection. The port may be configured to direct a fluid expelled therefrom in an inboard direction and toward the deflecting structure. The deflecting structure may be configured to receive the fluid expelled from the port and deflect the fluid such that the fluid opposes a flow direction of ingested working fluid that otherwise is traveling from the inlet of the trench cavity to a wheelspace cavity.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
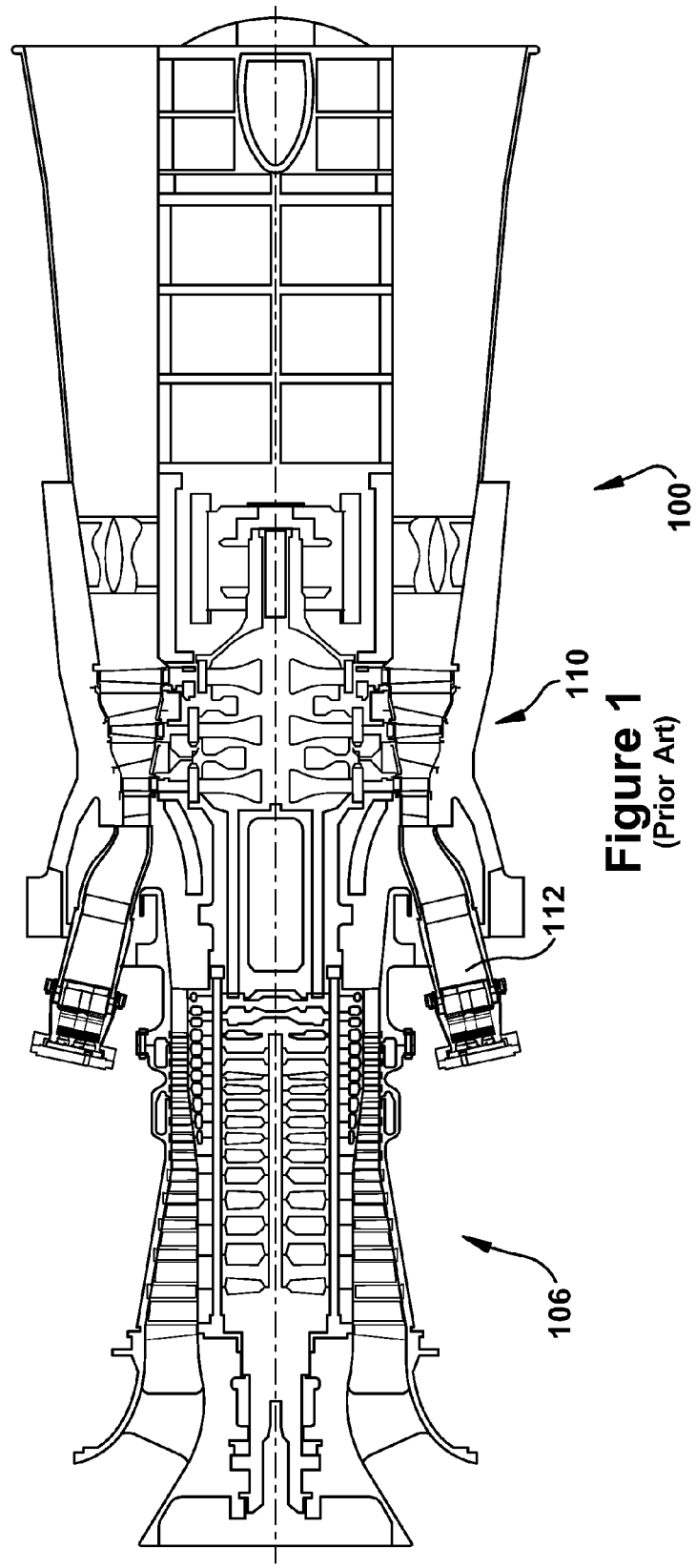
FIG. 1 is a schematic representation of an exemplary gas turbine engine in which embodiments of the present application may be used.

Referring now to the figures, FIG. 1 illustrates a schematic representation of a gas turbine engine 100, which will be used to describe an exemplary application of the present invention. It will be understood by those skill in the art that the present invention is not limited to this type of usage. As stated, the present invention may be used in gas turbine engines, such as the engines used in power generation and airplanes, steam turbine engines, and other type of rotary engines. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110.

Figure 2:
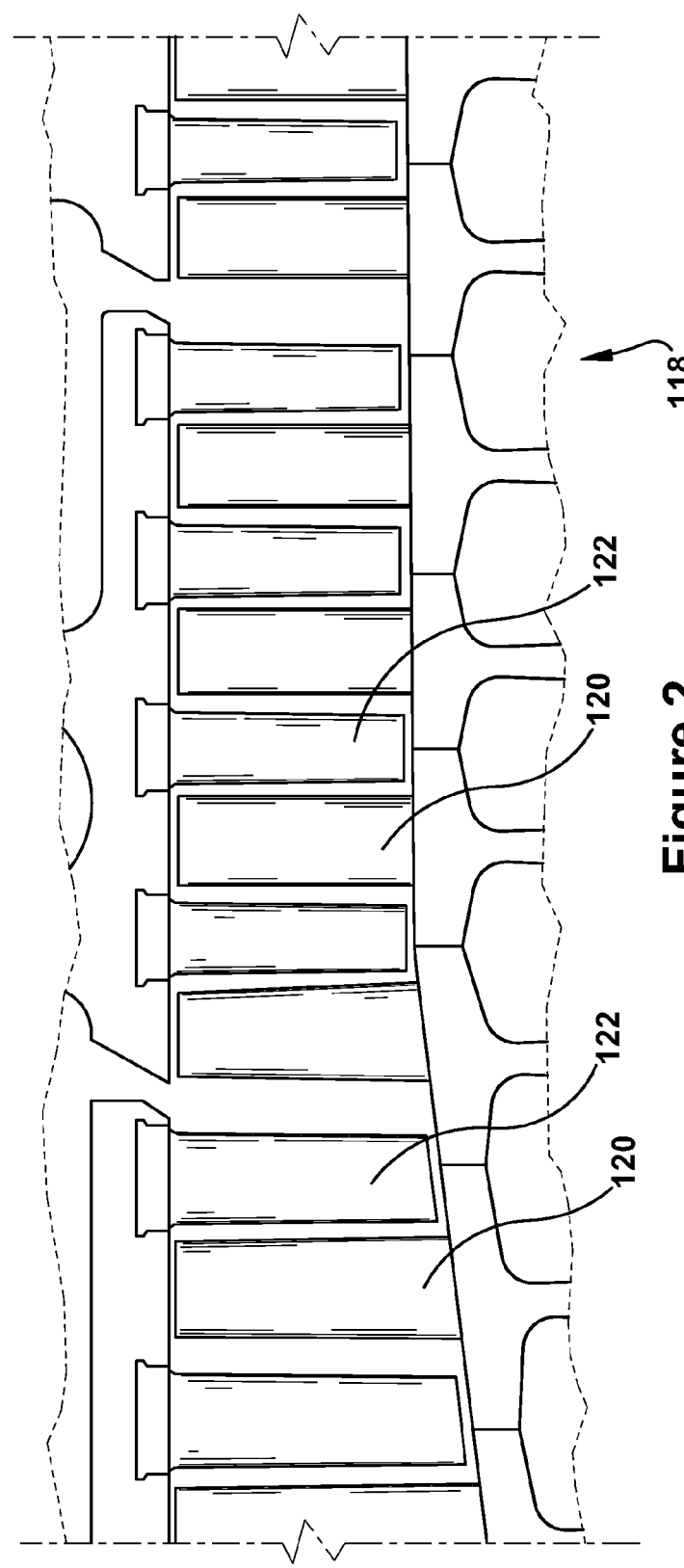
FIG. 2 is a sectional view of the compressor in the gas turbine engine of FIG. 1.

FIG. 2 illustrates a view of an exemplary multi-staged axial compressor 118 that may be used in the gas turbine engine of FIG. 1. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced and attached to the shaft; when the shaft rotates during operation, the compressor rotor blades 120 rotate about it. As one of ordinary skill in the art will appreciate, the compressor rotor blades 120 are configured such that, when spun about the shaft, they impart kinetic energy to the air or fluid flowing through the compressor 118. The compressor 118 may have other stages beyond the stages that are illustrated in FIG. 2. Additional stages may include a plurality of circumferential spaced compressor rotor blades 120 followed by a plurality of circumferentially spaced compressor stator blades 122.

Figure 3:
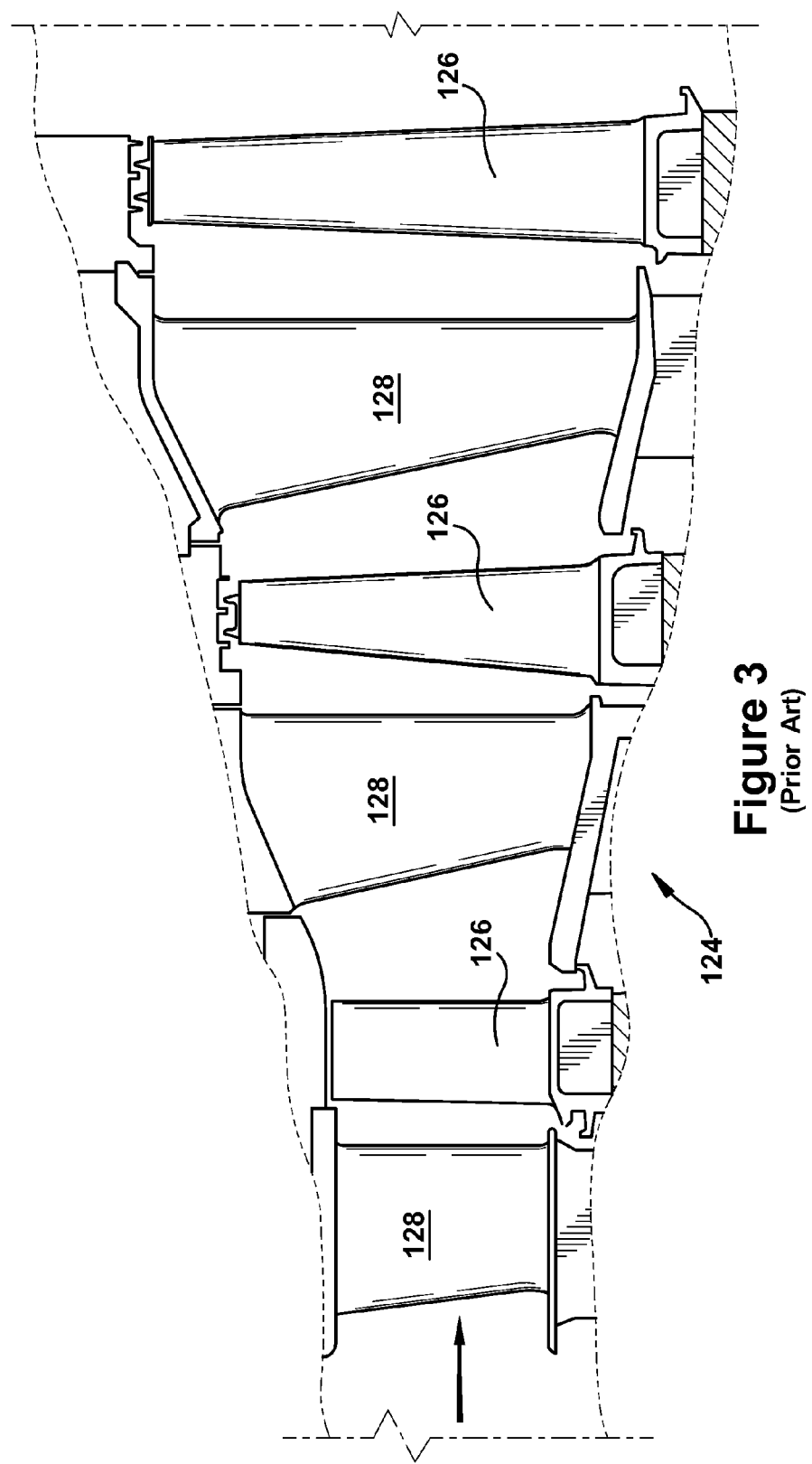
FIG. 3 is a sectional view of the turbine in the gas turbine engine of FIG. 1.

FIG. 3 illustrates a partial view of an exemplary turbine section or turbine 124 that may be used in the gas turbine engine of FIG. 1. The turbine 124 also may include a plurality of stages. Three exemplary stages are illustrated, but more or less stages may present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 also is illustrated. The second stage similarly includes a plurality of circumferentially spaced turbine stator blades 128 followed by a plurality of circumferentially spaced turbine rotor blades 126, which are also mounted on a turbine wheel for rotation. A third stage also is illustrated, and similarly includes a plurality of turbine stator blades 128 and rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have other stages beyond the stages that are illustrated in FIG. 3. Each additional stage may include a row of turbine stator blades 128 followed by a row of turbine rotor blades 126.

In use, the rotation of compressor rotor blades 120 within the axial compressor 118 may compress a flow of air. In the combustor 112, energy may be released when the compressed air is mixed with a fuel and ignited. The resulting flow of hot gases from the combustor 112, which may be referred to as the working fluid, is then directed over the turbine rotor blades 126, the flow of working fluid inducing the rotation of the turbine rotor blades 126 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 120, such that the necessary supply of compressed air is produced, and also, for example, a generator to produce electricity.

Before proceeding further, note that to communicate clearly the invention of the current application, it may be necessary to select terminology that refers to and describes certain machine components or parts of a turbine engine. Whenever possible, terminology that is used in the industry will be selected and employed in a manner consistent with its accepted meaning. However, it is meant that this terminology be given a broad meaning and not narrowly construed such that the meaning intended herein and the scope of the appended claims is restricted. Those of ordinary skill in the art will appreciate that often certain components are referred to with several different names. In addition, what may be described herein as a single part may include and be referenced in another context as several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component.

In addition, several descriptive terms may be used herein. The meaning for these terms shall include the following definitions. The term "rotor blade", without further specificity, is a reference to the rotating blades of either the compressor 118 or the turbine 124, which include both compressor rotor blades 120 and turbine rotor blades 126. The term "stator blade", without further specificity, is a reference the stationary blades of either the compressor 118 or the turbine 124, which include both compressor stator blades 122 and turbine stator blades 128. The term "blades" will be used herein to refer to either type of blade. Thus, without further specificity, the term "blades" is inclusive to all type of turbine engine blades, including compressor rotor blades 120, compressor stator blades 122, turbine rotor blades 126, and turbine stator blades 128. Further, as used herein, "downstream" and "upstream" are terms that indicate a direction relative to the flow of working fluid through the turbine. As such, the term "downstream" means the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" or "leading edge" refer to the upstream direction, the upstream end and/or in the direction of the upstream end of the component being described. The term "radial" refers to movement or position perpendicular to an axis. It is often required to describe parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "outboard" or "radially outward" of the second component. The term "axial" refers to movement or position parallel to an axis. And, the term "circumferential" refers to movement or position around an axis.

Figure 4:
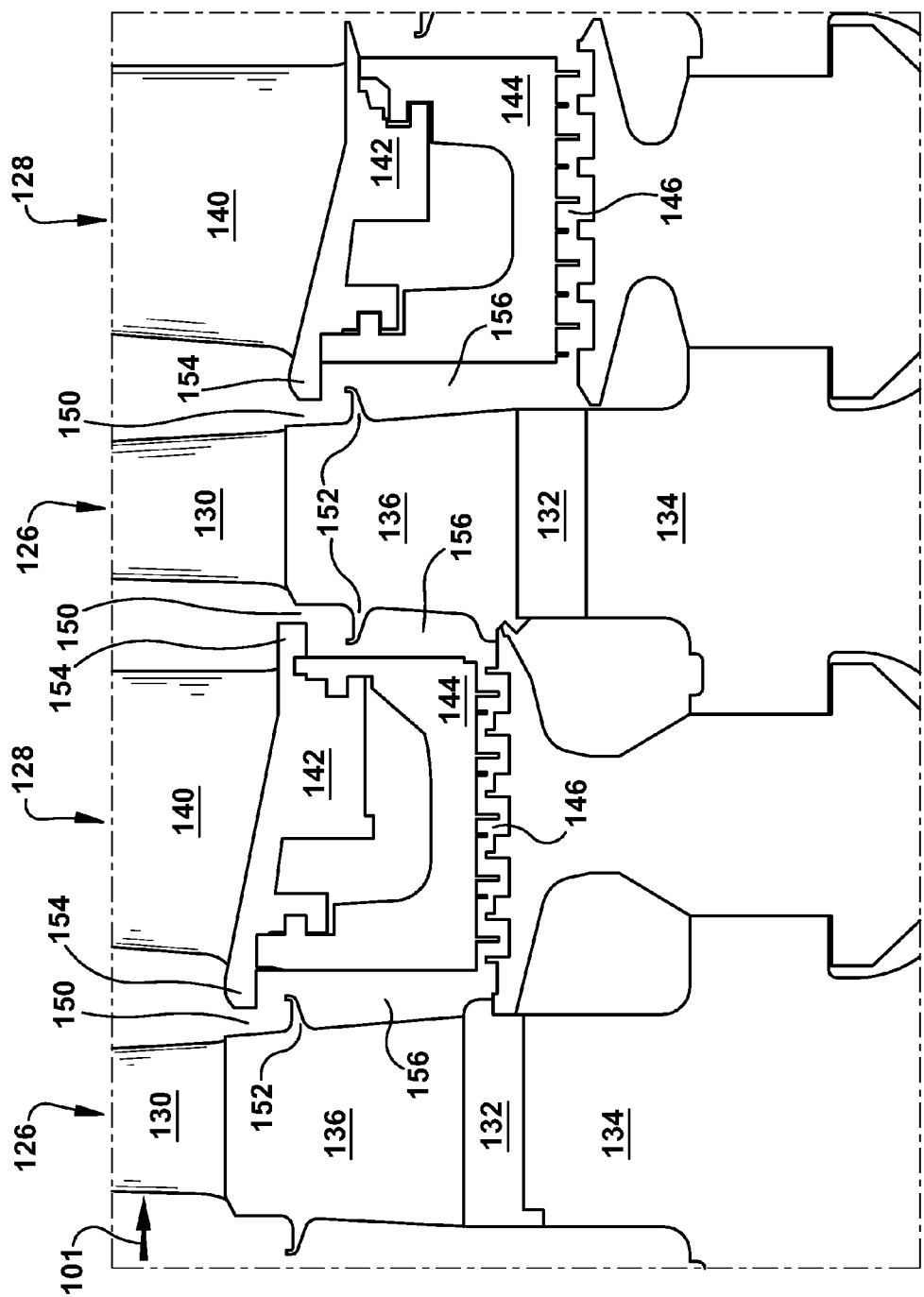
FIG. 4 is a schematic sectional view of the inner radial portion of several rows of rotor and stator blades as configured in an exemplary turbine according to conventional design.

Referring again to the figures, FIG. 4 schematically illustrates a sectional view of the several rows of blades as they might be configured in an exemplary turbine according to a conventional design. As one of ordinary skill in the art will appreciate, the view includes the radial inward features of two rows of rotor blades 126 and two rows of stator blades 128. Each rotor blade 126 generally includes an airfoil 130 that resides in the hot-gas path and interacts with the working fluid of the turbine (the flow direction of which is indicated by arrow 101), a dovetail 132 that attaches the rotor blade 126 to a rotor wheel 134, and, between the airfoil 130 and the dovetail 132, a section that is typically referred to as the shank 136. As used herein, the shank 136 is meant to refer to the section of the rotor blade 126 that resides between the attachment means, which in this case is the dovetail 132, and the airfoil 130. Each stator blade 128 generally includes an airfoil 140 that resides in the hot-gas path and interacts with the working fluid and, radially inward of the airfoil 140, an inner sidewall 142 and, radially inward of the inner sidewall 142, a diaphragm 144. Typically, the inner sidewall 142 is integral to the airfoil 140 and forms the inner boundary of the hot-gas path. The diaphragm 144 typically attaches to the inner sidewall 142 (though may be formed integral therewith) and extends in an inward radial direction to form a seal 146 with the rotating machinery.

It will be appreciated that axial gaps are present along the radially inward edge of the hot-gas path. Generally, these gaps, which will be referred to herein as "trench cavities 150", are present because of the space that must be maintained between the rotating parts (i.e., the rotor blades 126) and the stationary parts (i.e., the stator blades 128). Because of the way the engine warms up, operates at different load conditions, and the differing thermal expansion coefficients of some of the components, the width of the trench cavity 150 (i.e., the axial distance across the gap) generally varies. That is, the trench cavity 150 may widen and shrink depending on the way the engine is being operated. Because it is highly undesirable for the rotating parts to rub against stationary parts, the engine must be designed such that at least some space is maintained at the trench cavity 150 locations during all operating conditions. This generally results in a trench cavity 150 that has a relatively narrow opening during some operating conditions and a relatively wide opening during other operating conditions. Of course, a trench cavity 150 with a relatively wide opening is undesirable because it invites more working fluid ingestion into the turbine wheelspace.

It will be appreciated that a trench cavity 150 generally exists at each point along the radially inward boundary of the hot-gas path where rotating parts border stationary parts. Thus, as illustrated, a trench cavity 150 is formed between the trailing edge of the rotor blade 126 and the leading edge of the stator blade 128 and between the trailing edge of the stator blade 128 and the leading edge of the rotor blade 126. Typically, in regard to the rotor blades 126, the shank 136 defines one edge of the trench cavity 150, and, in regard to the stator blades 128, the inner sidewall 142 defines the other edge of the trench cavity 150. Often, axial projecting projections may be configured within the trench cavity 150 so to provide a tortuous path that limits ingestion of working fluid. As shown, angel wing projections 152 may be formed on the shank 136 of the rotor blades 126. Outboard of the angel wing projections 152, the inner sidewall 142 of the stator blade 128 may project toward the rotor blade 126, thereby forming a stator projection 154. Generally, inboard of the angel wing 152, the trench cavity 150 is said to transition into a wheelspace cavity 156.

As stated, it is desirable to prevent the working fluid of the hot-gas path from entering the trench cavity 150 and the wheelspace cavity 156 because the extreme temperatures may damage the components within this area. The overlapping angel wing 152 and the stator projection 154 are formed to limit ingestion. However, because of the varying width of the trench cavity 150 opening and the relative ineffectiveness of the seal for by the angel wing 152/stator projection 154 combination, working fluid would be regularly ingested into the wheelspace cavity 156 if the cavity were not purged with a relatively high level of compressed air bled from the compressor. As stated, because purge air negatively affects the performance and efficiency of the engine, its usage should be minimized.

Figure 5:
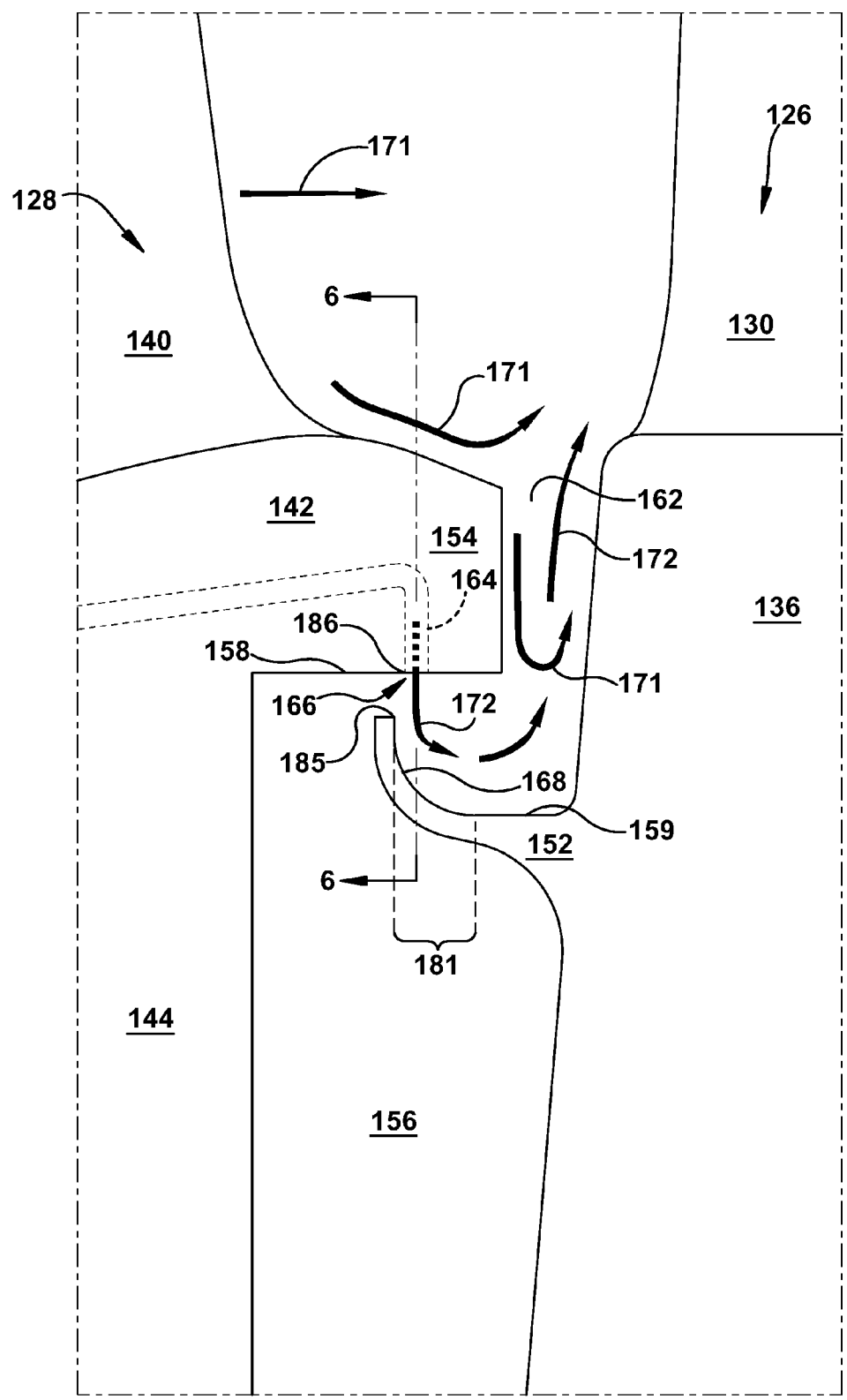
FIG. 5 is a sectional view of a trench cavity and a flow curtain/angel wing projection assembly according to an exemplary embodiment of the present invention.
Figure 6:
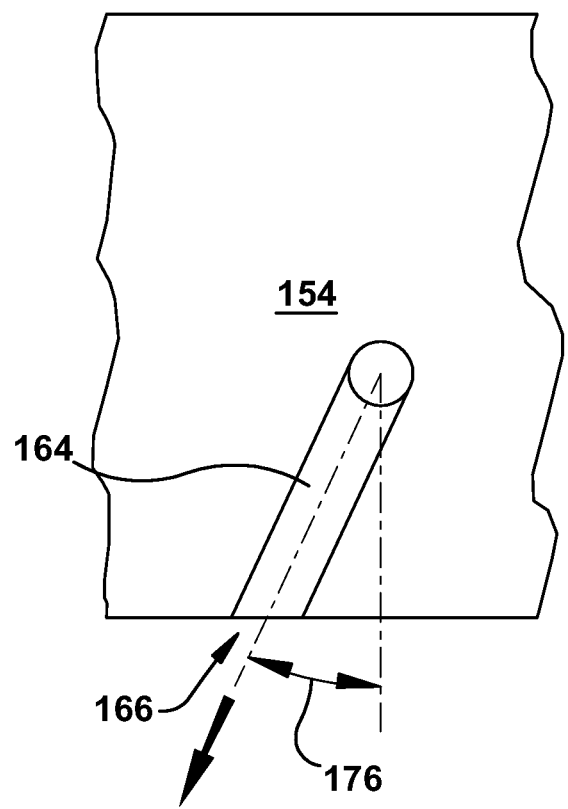
FIG. 6 is a cross-sectional view along line 6-6 of FIG. 5.

FIGS. 5 and 6 provide seal assemblies according to preferred embodiments of the present invention. In general, the seals are formed in a trench cavity 150, which, as stated, include the axial gap that extends circumferentially between the rotating parts and the stationary parts of the turbine. The trench cavity 150 may be formed between the trailing edge of the rotor blade 126 and the leading edge of the stator blade 128, as well as the trailing edge of the stator blade 128 and the leading edge of the rotor blade 126. As used herein, an inlet 162 of the trench cavity 150 includes the point at which the trench cavity 150 intersects a main flow path 171 through the turbine. The rotor blade 126 includes an airfoil 130 that resides in a main flow path through the turbine and interacts with the flow of working fluid flowing therethrough. The rotor blade 126 generally includes a dovetail 132 by which it is attached to a rotor wheel 134. Between the airfoil 130 and the dovetail 132, the rotor blade 126 typically includes a shank 136. The turbine stator blade 128 generally includes an airfoil 140 that resides in the main flow path through the turbine and interacts with the flow of working fluid flowing therethrough and, radially inward of the airfoil 140, an inner sidewall 142 that forms an inner boundary of the main flow path. Radially inward of the inner sidewall 142, a diaphragm 144 may form a second seal with one or more rotating components.

As shown in FIGS. 5 and 6, seal according to the present invention are formed within a trench cavity 150 that is defined between a rotor blade 126 and a stator blade 128. In preferred embodiments, the stator blade 128 includes a stator projection 154 that extends toward the rotor blade 126. The stator projection 154 may be formed on the inner sidewall 142 of the stator blade 128. In addition, the rotor blade 126 may include an angel wing projection 152 that extends toward the stator blade 128. In this configuration, as illustrated, the stator projection 154 may be described as overhanging the angel wing projection 152. That is, the stator projection 154 and the angel wing projection 152 may be said to axially overlap (i.e., have the same axial position). The angel wing projection 152, as illustrated, is positioned inboard of the stator projection 154. As part of the seal, a port 166 may be disposed on an inboard surface 158 of stator projection 154 and a deflector or deflecting structure 168 may be positioned on an outboard surface 159 of the angel wing projection 152.

The port 166 may be configured to direct a fluid expelled therefrom toward the deflecting structure 168. The deflecting structure 168 may be configured to receive the fluid (represented by arrow 172 depicting flow direction) expelled from the port 166 and deflect the fluid toward an inlet 162 of the trench cavity 150. The fluid expelled by the port 166 may be a coolant, which, typically, is compressed air bled from the compressor 118. As shown, the port 166 may be configured to fluidly communicate with an interior cooling channel 164 formed within the stator blade 128. This may be achieved in any conventional manner. The interior cooling channel 164 may be configured to circulate coolant through the stator blade 128 during operation of the combustion turbine engine.

In general, the angel wing projection 152 is an axially extending rigid tooth. As shown in FIG. 5, in certain embodiments, the deflecting structure 168 includes a hooking curved portion positioned toward a distal end of the angel wing projection 152. The hooking curved portion includes a concave curve that extends both axially and radially. As illustrated, in a preferred embodiment, the radial component of the extension of the hooking curved portion is the outboard direction. The axial component of the extension of the hooking curved portion is in the axial direction that is away from the rotor blade 126. In other embodiments, the deflecting structure 168 includes a canted linear portion positioned at a distal end of the angel wing projection 152. The canted linear portion may include a linear portion that extends both axially and radially, which is canted in relation to the port 166. As illustrated, in a preferred embodiment, the radial component of the extension of the canted linear portion is the outboard direction, and the axial component of the extension of the canted linear portion is in the axial direction that is away from the rotor blade 126.

As illustrated in FIG. 6, the port 166 may be canted in the circumferential direction. In relation to a reference line aimed inboard at the turbine axis (hereinafter "inboard trained reference line 174"), the port 166 may be circumferentially canted either against or with the direction of rotation of the rotor blades. In preferred embodiments, the port 166 is circumferentially canted (or has a circumferential aimed direction) such that the angle 176 formed with the inboard trained reference line 174 is between 60° toward (or against) the direction of rotation of the rotor blades and 60° with the direction of rotation of the rotor blades. In another preferred embodiment, the port 166 is circumferentially canted with the direction of rotation of the rotor blades, which, it will be appreciated, may decrease aerodynamic losses. As stated, in some embodiments, the port 166 may have no circumferential cant, thereby having a circumferential aimed direction that is the substantially the same as the inboard aim reference line 174.

Figure 7:
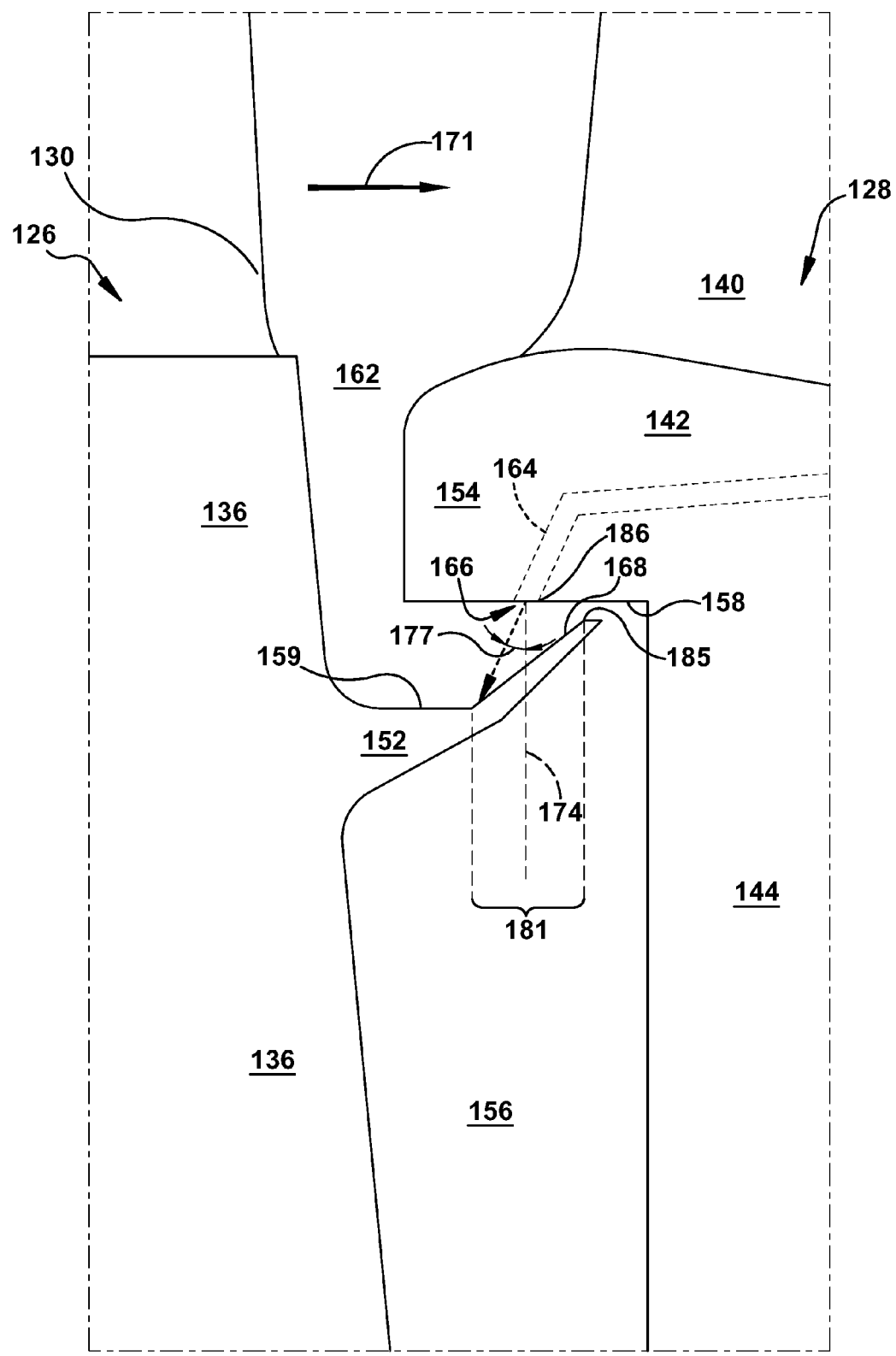
FIG. 7 is a sectional view of a trench cavity and a flow curtain/angel wing projection assembly according to an alternative embodiment of the present invention.

As shown in FIG. 7, the port 166 may be canted in the axial direction. As described above, the inboard trained reference line 174 is a reference line originating at the port 166 that extends precisely in the inboard direction toward the axis of the turbine, as represented in FIG. 7. In certain embodiments, the port 166 is axially canted (or has an axial aimed direction) within +/−20° of the inboard trained reference line 174. In other preferred embodiments, the port 166 is axially canted within +/−10° of the inboard trained reference line 174. As stated, in some embodiments, the port 166 may have no axial cant, thereby having an axial aimed direction that is the substantially the same as the inboard aim reference line 174.

In relation to the inboard aimed reference line 174, a positive angle 177 for the axial cant of the port 166 may be said to describe a port 166 aimed away from the stator blade 128 on which the port 166 is positioned, and a negative angle 177 for the axial cant of the port 166 may be said to describe a port 166 aimed toward the stator blade 128 on which the port 166 is positioned. In certain preferred embodiments, the axial aimed direction of the port 166 includes a positive angle 177, as shown in FIG. 7. In certain embodiments, the axial aimed direction of the port 166 includes one canted in opposition of a flow direction of ingested working fluid traveling from the inlet of the trench cavity 150 to a wheelspace cavity (an example of which is shown in FIG. 7). More specifically, in certain embodiments, the axial aimed direction of the port 166 is a positive angle between 5° and 20°. It will be appreciated that the port 166 may be canted in both the axial and circumferential directions, one direction, or in neither directions.

As shown in FIG. 5, the angel wing projection 152 may be disposed on an upstream side of the rotor blade, and the port 166 may be disposed on the downstream side of the stator blade. Alternatively, the angel wing projection 152 may be disposed on a downstream side of the rotor blade, and the port 166 may be disposed on the upstream side of the stator blade.

As one of ordinary skill in the art will appreciate, a combustion turbine engine typically has at least a plurality of operating conditions. Due to thermal expansion/contraction, the axial width of the trench cavity 150 typically varies depending upon the operating condition of the engine. For example, in one mode of operation, such as when the engine is starting, the temperature of the engine may be low and the opening of the trench cavity 150 may be at its narrowest. During another mode of operation, such as when the engine is carrying a high load or output, the temperature of the engine may be very high and the opening of the trench cavity 150 may be at its widest. It will be appreciated that the variation of the width of the trench cavity 150 results in the axial alignment of the port 166 and the deflecting structure 168 also varying. In certain preferred embodiments, the port 166 and the deflecting structure 168 of the angel wing projection 152 may be configured such that, when the trench cavity 150 has the narrowest opening, the port 166 may be well inside the deflecting structure 168 of the angel wing projection 152, and, when the trench cavity 150 has the widest opening, the port 166 may be just inside the deflecting structure 168 of the angel wing projection 152. As used herein, the term "inside" describes the condition where a far edge 185 of the deflecting structure 168 is at a position that aligns axially with a near edge 186 of the port 166 such that, in operation, the fluid exiting the port 166 is inside of the deflecting structure 168 (in relation to the direction in which the deflecting structure 168 is configured to direct the flow from the port).

The combustion turbine engine also may include an expected steady state operating condition which may coincide with a typical or expected load level. In such cases, the port 166 and the deflecting structure 168 may be configured such that during the expected steady state operating condition, the port 166 and the deflecting structure 168 have a preferred axial alignment. As shown in FIGS. 5 and 6, in certain embodiments of the present application, the preferred axial alignment includes an alignment in which an axial position of the port 166 is within the axial range 181 of the deflecting structure 168 (i.e., the range of axial positions covered by the deflecting structure 168). In other embodiments, the preferred axial alignment includes an alignment in which the port 166 is aimed at the deflecting structure 168.

In certain embodiments, a longitudinal axis of the angel wing projection 152 is aligned circumferentially and extends continuously along the circumferential width of the shank. In certain embodiments, the port 166 may include a plurality of discrete ports 166 spaced along the circumferential width of the sidewall. In other embodiments, the port 166 includes a slot extending continuously along the circumferential width of the inner sidewall 142.

In operation, the port 166 and the deflecting structure 168 may be configured such that the deflected fluid forms an air curtain within the trench cavity 150 that resists the ingestion of a working fluid through the trench cavity 150. Such flow patterns are represented by the flow arrows 171, 172 of FIG. 5.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A seal in a turbine of a combustion turbine engine, wherein the seal is formed within a trench cavity defined between a rotor blade and a stator blade, wherein the stator blade includes a sidewall projection extending toward the rotor blade and the rotor blade includes an angel wing projection extending toward the stator blade, the side wall projection overhanging the angel wing projection, the seal comprising:
    a port disposed on an inboard surface of a stator projection; and
    deflecting structure disposed on an outboard surface of the angel wing projection;
    wherein:
        the port is configured to direct a fluid expelled therefrom toward the deflecting structure;
        the deflecting structure is configured to receive the fluid expelled from the port and deflect the fluid toward an inlet of the trench cavity;
        the side wall projection axially overlaps the angel wing projection;
        the angel wing projection comprises a position inboard of the side wall projection;
        the fluid comprises a coolant;
        an inboard aimed reference line comprises a reference line originating at the port and aimed precisely in the inboard direction;
        the port comprises an axial aimed direction within +/−20° of the inboard aimed reference line; and
        the port comprises an circumferential aimed direction within +/−60° of the inboard aimed reference line.

2. The combustion turbine engine seal according to claim 1, wherein the angel wing projection comprises an axially extending rigid tooth;
    wherein the deflecting structure comprises a hooking curved portion positioned toward a distal end of the angel wing projection;
    wherein the hooking curved portion comprises a concave curve that extends both axially and radially;
    wherein a radial component of the hooking curved portion comprises an outboard direction; and
    wherein an axial component of the hooking curved portion comprises an axial direction that is away from the rotor blade.

3. The combustion turbine engine seal according to claim 1, wherein the angel wing projection comprises an axially extending rigid tooth;
    wherein the deflecting structure comprises a canted linear portion positioned at a distal end of the angel wing projection;
    wherein the canted linear portion comprises a linear portion that extends both axially and radially;
    wherein a radial component of the canted linear portion comprises an outboard direction; and
    wherein an axial component of the canted linear portion comprises an axial direction that is away from the rotor blade.

4. The combustion turbine engine seal according to claim 1, wherein, in respect to the inboard aimed reference line, a positive angle for the axial aimed direction of the port comprises one aimed away from the stator blade on which the port is disposed and a negative angle for the axial aimed direction of the port comprises one aimed toward the stator blade on which the port is disposed;
    wherein the axial aimed direction of the port comprises a positive angle; and
    wherein the circumferential aimed direction is with a direction of rotation of the rotor blade.

5. The combustion turbine engine seal according to claim 4, wherein the axial aimed direction of the port comprises a positive angle direction between 5° and 20°.

6. The combustion turbine engine seal according to claim 1,
    wherein the axial aimed direction of the port is within +/−10° of the inboard aimed reference line;
    wherein the circumferential aimed direction of the port is within +/−30° of the inboard aimed reference line.

7. The combustion turbine engine seal according to claim 1, wherein the axial aimed direction of the port is substantially the same as the inboard aimed reference line; and
    wherein the circumferential aimed direction of the port is substantially the same as the inboard aimed reference line.

8. The combustion turbine engine seal according to claim 1, wherein the angel wing projection is disposed on an upstream side of the rotor blade and the port is disposed on the downstream side of the stator blade.

9. The combustion turbine engine seal according to claim 1, wherein the angel wing projection is disposed on a downstream side of the rotor blade and the port is disposed on the upstream side of the stator blade.

10. The combustion turbine engine seal according to claim 1, wherein the trench cavity comprises an axial gap that extends circumferentially between the rotating parts and the stationary parts of the turbine;

wherein the trench cavity is formed between the trailing edge of the rotor blade and the leading edge of the stator blade, and the trailing edge of the stator blade and the leading edge of the rotor blade;

wherein the inlet of the trench cavity comprises a point at which the trench cavity intersects a main flow path through the turbine;

wherein the rotor blade includes an airfoil that resides in a main flow path through the turbine and interacts with a working fluid flowing therethrough, a dovetail for attaching the rotor blade to a rotor wheel, and, between the airfoil and the dovetail, a shank;

wherein the turbine stator blade includes an airfoil that resides in the main flow path through the turbine and interacts with the working fluid flowing therethrough and, radially inward of the airfoil, an inner sidewall that forms an inner boundary of the main flow path and, radially inward of the inner sidewall, a diaphragm that forms a second seal with one or more rotating components.

11. The combustion turbine engine seal according to claim 1, wherein:

the turbine engine comprises at least a plurality of operating conditions; and an axial width of the trench cavity varies depending upon the operating condition under which the turbine engine operates such that the trench cavity comprises a narrow width during a first operating condition and a wide width during a second operating condition;

wherein the port and the deflecting structure of the angel wing projection are configured such that, when the trench cavity comprises the narrow width, the port is well inside the deflecting structure of the angel wing projection; and wherein the port and the deflecting structure of the angel wing projection are configured such that, when the trench cavity comprises the wide width, the port is just inside the deflecting structure of the angel wing projection.

12. The combustion turbine engine seal according to claim 11, wherein the turbine engine comprises an expected steady state operating condition; and wherein the port and the deflecting structure are configured such that during the expected steady state operating condition, the port and the deflecting structure comprise a preferred axial alignment.

13. The combustion turbine engine seal according to claim 12, wherein the preferred axial alignment comprises an alignment in which an axial position of the port falls within an axial range of the deflecting structure.

14. The combustion turbine engine seal according to claim 12, wherein the preferred axial alignment comprises one in which the port is aimed at the deflecting structure; and wherein an axial aimed direction of the port comprises one canted in opposition of a flow direction of ingested working fluid traveling from the inlet of the trench cavity to a wheelspace cavity.

15. The combustion turbine engine seal according to claim 12, wherein the port is configured to fluidly communicate with an interior cooling channel formed within the stator blade, the interior cooling channel being configured to circulate the coolant through the stator blade during operation of the combustion turbine engine; and wherein the port and the deflecting structure are configured such that, in operation, the deflected fluid forms an air curtain within the trench cavity that resists the ingestion of a working fluid through the trench cavity.

16. The combustion turbine engine seal according to claim 12, wherein a far edge of the deflecting structure comprises a position that aligns axially with a near edge of the port such that, in operation, substantially all of the fluid exiting the port is aimed inside of the deflecting structure.

17. The combustion turbine engine seal according to claim 1, wherein the angel wing projection extends along a circumferential width of the shank, and the port comprises a plurality of discrete ports spaced along a circumferential width of the sidewall.

18. The combustion turbine engine seal according to claim 1, wherein the angel wing projection extends along a circumferential width of the shank, and the port comprises a slot extending along a circumferential width of the sidewall.

* * * * *